US006310279B1

(12) United States Patent
Suzuki et al.

(10) Patent No.: US 6,310,279 B1
(45) Date of Patent: *Oct. 30, 2001

(54) DEVICE AND METHOD FOR GENERATING A PICTURE AND/OR TONE ON THE BASIS OF DETECTION OF A PHYSICAL EVENT FROM PERFORMANCE INFORMATION

(75) Inventors: Hideo Suzuki; Yoshimasa Isozaki; Satoshi Sekine, all of Hamamatsu (JP)

(73) Assignee: Yamaha Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/216,390

(22) Filed: Dec. 18, 1998

(30) Foreign Application Priority Data

Dec. 27, 1997 (JP) .................................................. 9-369050

(51) Int. Cl.[7] ............................ G09B 15/04; G10H 1/00; G10H 7/00

(52) U.S. Cl. ........................ 84/600; 84/464 R; 84/477 R

(58) Field of Search ................................ 84/600, 464 R, 84/464 A, 477 R, 478, 609–614; 434/307 A

(56) References Cited

U.S. PATENT DOCUMENTS 5,005,459 4/1991 Adachi et al. .
5,083,201 1/1992 Ohba .
5,159,140 * 10/1992 Kimpara et al. ........................ 84/600
5,214,231 5/1993 Ernst et al. .
5,391,828 2/1995 Tajima .
5,491,297 * 2/1996 Johnson et al. ................ 84/477 R X
5,563,358 * 10/1996 Zimmerman ........................ 84/477 R
5,585,583 12/1996 Owen .
6,087,577 * 7/2000 Yahata et al. .......................... 84/478

FOREIGN PATENT DOCUMENTS 4-155390 5/1992 (JP) .
5-73048 3/1993 (JP) .

* cited by examiner

*Primary Examiner*—Stanley J. Witkowski
(74) *Attorney, Agent, or Firm*—Morrison & Foerster LLP

(57) ABSTRACT

When performance information, such as MIDI data, is input, physical events or phenomena are simulated on the basis of the input performance information, and computer graphics or CG parameters and tone parameters are determined on the basis of the simulated results. The determined CG parameters are passed to a general-purpose CG library, while the determined tone parameters are passed to a tone generator driver. The general-purpose CG library generates data representing a three-dimensional configuration of an object on the basis of the received CG parameters, and executes a rendering operation to generate two-dimensional picture data on the basis of the three-dimensional data, so that the thus-generated two-dimensional picture data is visually displayed. The tone generator driver generates a tone signal on the basis of the received tone parameters, which is audibly reproduced as an output tone. By thus controlling the tone and picture collectively, it is possible to accurately simulate a performance on a musical instrument on the real-time basis.

23 Claims, 10 Drawing Sheets

DEVICE AND METHOD FOR GENERATING A PICTURE AND/OR TONE ON THE BASIS OF DETECTION OF A PHYSICAL EVENT FROM PERFORMANCE INFORMATION

BACKGROUND OF THE INVENTION

The present invention relates to devices of and methods for generating tones and pictures on the basis of input performance information.

Various tone and picture generating devices have been known which are designated to generate tones and pictures on the basis of input performance information, such as MIDI (Musical Instrument Digital Interface) data. One type of the known tone and picture generating devices is arranged to control display timing of each frame of pre-made picture data while generating tones on the basis of MIDI data. There have also been known another-type tone and picture generating devices which generate tones by controlling a toy or robot on the basis of input MIDI data.

In the first-type known tone and picture generating devices, the quality of generated pictures depends on the quality of the picture data, due to the arrangement that the timing to display each frame of the pre-made picture data is controlled on the basis of the MIDI data alone. Thus, in a situation where a performance on the musical instrument based on the MIDI data, i.e., motions of the player and musical instrument, is to be reproduced by computer graphics (hereinafter abbreviated "CG"), it is necessary for a human operator to previously analyze the MIDI data (or musical score) and create each frame using his or her own sensitivity and discretion, which would thus require difficult, complicated and time-consuming works. Thus, with these known devices, it is not possible to synthesize the performance through computer graphics. In addition, because tones and pictures are generated on the MIDI data independently of each other, the tone and picture generating devices would present the problem that the quality of the generated tones and pictures can not be enhanced simultaneously or collectively; that is, the generated pictures (with some musical expression) can not be enhanced even when the quality of the generated tones (with some musical expression) is enhanced successfully, or vice versa.

Further, the second-type known tone and picture generating devices, designed to generate tones by controlling a toy or robot, can not accurately simulate actual performance motions of a human player although they are capable of generating tones, because their behavior is based on the artificial toy or robot.

SUMMARY OF THE INVENTION

It is therefore an object of the present invention to provide a tone and picture generating device and method which can accurately simulate a performance on a musical instrument in real time, by controlling a tone and picture collectively.

In order to accomplish the above-mentioned object, the present invention provides a tone and picture generating device which comprises: a performance information receiving section that receives performance information; a simulating section that, on the basis of the performance information received via the performance information receiving section, simulates a physical event of at least one of a player and a musical instrument during player's performance operation of the musical instrument; a parameter generating section that, in accordance with a result of simulation by the simulating section, generates a picture parameter for controlling a picture and a tone parameter for controlling a tone; a picture information generating section that generates picture information in accordance with the picture parameter generated by the parameter generating section; and a tone information generating section that generates tone information in accordance with the tone parameter generated by the parameter generating section.

The performance information typically comprises MIDI data, although it is, of course, not limited to such MIDI data alone. Examples of the physical event or phenomenon include, for example, a motion of the player made in generating a tone corresponding to the input performance information, a motion of the musical instrument responding to the player's motion and deformation in contacting surfaces of the player's body and an instrument's component part or object. As the picture information generating section, a general-purpose computer graphics (CG) library or a dedicated CG library is preferably used; however, any other picture information generating facilities may be used as long as they are capable of performing CG synthesis of a performance by just being supplied with parameters. The picture information is typically bit map data, but may be any other form of data as long as they can be visually shown on a display device. Further, the tone information is typically a tone signal, digital or analog. In a situation where an external tone generator, provided outside the tone and picture generating device, generates a tone signal in accordance with an input parameter, the tone information corresponds to the input parameter.

The present invention can be arranged and practiced as a method invention as well as the device invention as mentioned above. Further, the present invention can be implemented as a computer program or microprograms for execution by a DSP, as well as a recording medium containing such a computer program or microprograms.

BRIEF DESCRIPTION OF THE DRAWINGS

For better understanding of the above and other features of the present invention, the preferred embodiments of the invention will be described in greater detail below with reference to the accompanying drawings, in which.

DETAILED DESCRIPTION OF THE PREFERRED EMBODIMENTS

Figure 1:
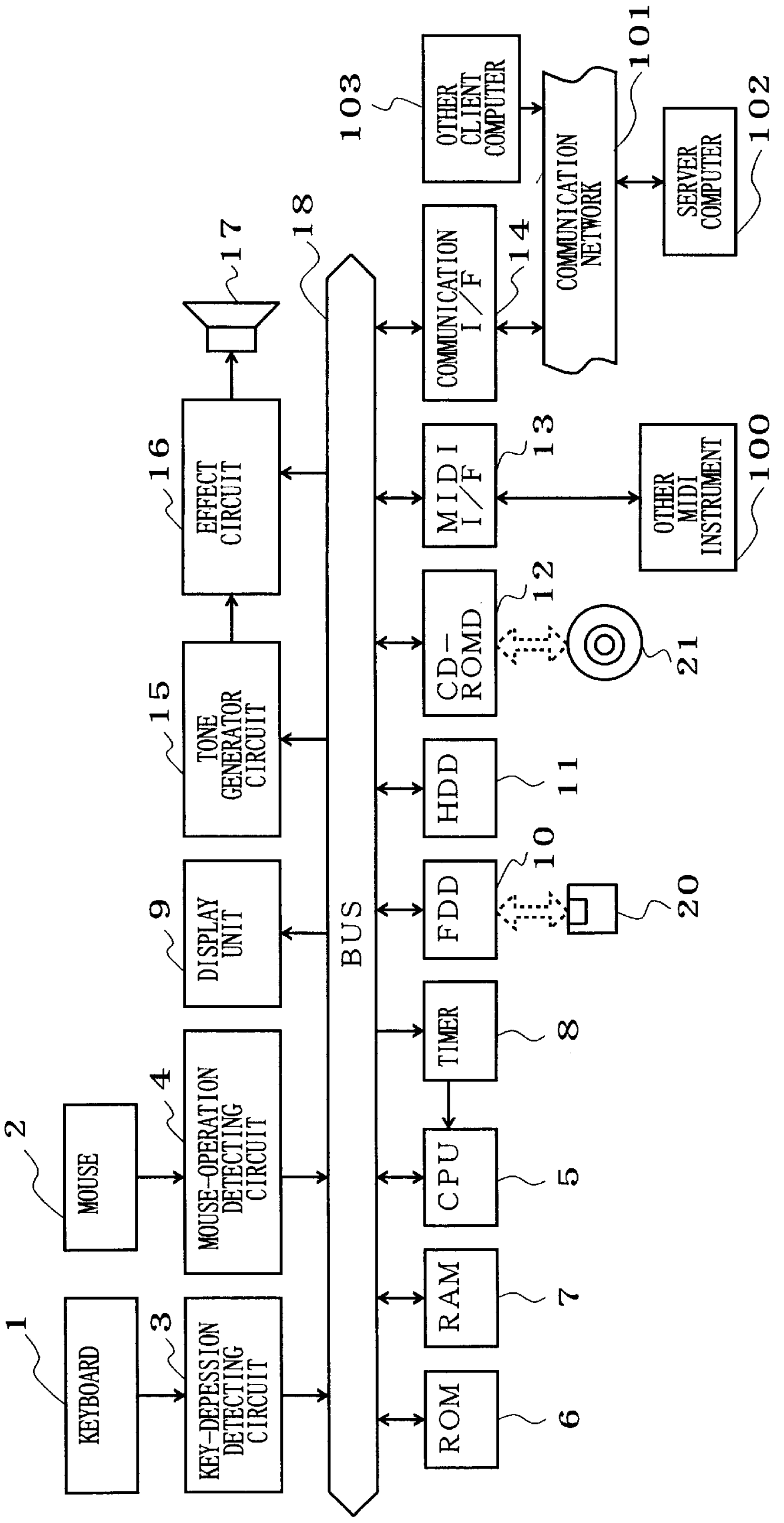
FIG. 1 is a block diagram showing an exemplary hardware setup of a tone and picture generating device in accordance with an embodiment of the present invention.

FIG. 1 is a block diagram showing an exemplary hardware setup of a tone and picture generating device in accordance with an embodiment of the present invention. As shown in the figure, the tone and picture generating device of the invention includes a keyboard 1 for entering character information and the like, a mouse 2 for use a s a pointing device, a key-depression detecting circuit 3 for detecting operating states of the individual keys on the keyboard 1, and a mouse-operation detecting circuit 4 for detecting an operating state of the mouse 2 The tone and picture genera ting device also includes a CPU 5 for controlling operation of all elements of the device, a ROM 6 storing control programs and table data for use by the CPU 5, and a RAM 7 for temporarily storing tone data and tone-related data, various input information, results of arithmetic operations, etc. The tone and picture generating device further includes a timer 8 for counting clock pulses to indicate various timing such as interrupt timing in timer-interrupt processes, a display unit 9 including, for example, a large-size liquid crystal display (LCD) or cathode ray tube (CRT) and light emitting diodes (LEDs), a floppy disk drive (FDD) 10 for driving a floppy disk (FD), a hard disk drive (HDD) 11 for driving a hard disk (not shown) for storing various data such as a waveform database which will be later described in detail, and a CD-ROM drive (CD-ROMD) 12 for driving a compact disk read-only memory (CD-ROM) 21 storing various data.

Also included in the tone and picture generating device are a MIDI interface (I/F) 13 for receiving MIDI data (or codes) from an external source and transmitting MIDI data to a designated external destination, a communication interface (I/F) 14 for communicating data with, for example, a server computer 102, a tone generator circuit 15 for converting, into tone signals, performance data input via the MIDI interface 13 or communication interface 14 as well as preset performance data, an effect circuit 16 for imparting various effects to the tone signals output from the tone generator circuit 15, and a sound system 17 including a digital-to-analog converter (DAC), amplifiers and speakers and functioning to audibly reproduce or sound the tone signals from the effect circuit 16.

The above-mentioned elements 3 to 16 are interconnected via a bus 18, and the timer 8 is connected to the CPU 5. Another MIDI instrument 100 is connected to the MIDI interface 13, a communication network 101 is connected to the communication interface 14, the effect circuit 16 is connected to the tone generator circuit 15, and the sound system 17 is connected to the effect circuit 16.

Further, although not specifically shown, one or more of the control programs may be stored in an external storage device such as the hard disk drive 11. Where a particular one of the control programs is not stored in the ROM 6 of the device, the CPU 5 can operate in exactly the same way as where the control program is stored in the ROM 6, by just storing the control program in the hard disk drive 11 and then reading the control program into the RAM 7. This arrangement greatly facilitates version-up of the control program, addition of a new control program, etc.

Control program and various data read out from the CD-ROM 21 installed in the CD-ROM drive 12 are stored into the hard disk installed in the hard disk drive 11. This arrangement also greatly facilitates version-up of the control program, addition of a new control program, etc. In place of or in addition to the CD-ROM drive 12, the tone and picture generating device may employ any other external storage devices for handling other recording media, such as an magneto-optical (MO) disk device.

The communication interface 14 is connected to a desired communication network 101, such as a LAN (Local Area Network), Internet or telephone network, to exchange data with the server computer 102 via the communication network 101. Thus, in a situation where one or more of the control programs and various parameters are not contained in the hard disk drive within the hard disk drive 11, these control programs and parameters can be downloaded from the server computer 102. In such a case, the tone and picture generating device, which is a "client" computer, sends a command requesting the server computer 102 to download the control programs and various parameters by way of the communication interface 14 and communication network 101. In response to the command, the server computer 102 delivers the requested control programs and parameters to the tone and picture generating device or client computer via the communication network 101. Then, the client computer receives the control programs and parameters via the communication interface 14 and accumulatively store them into the hard disk within the hard disk drive 11. In this way, the necessary downloading of the control programs and parameters is completed. The tone and picture generating device may also include an interface for directly communicating data with an external computer.

The tone and picture generating device of the present invention is implemented using a general-purpose computer, as stated above; however, the tone and picture generating device may of course be constructed as a device dedicated to the tone and picture generating purpose.

Briefly stated, the tone and picture generating device of the present invention is intended to achieve more real tone reproduction and computer graphics (CG) synthesis by simulating respective motions of a human player and a musical instrument (physical events or phenomena) in real time on the basis of input MIDI data and interrelating picture display and tone generation on the basis of the motions of the human player and musical instrument, i.e., simulated results. With this characteristic arrangement, the tone and picture generating device of the present invention can, for example, simulate player's striking or plucking of a guitar string with a pick or plectrum to control tone generation on the basis of the simulated results, control picture generation and tone generation based on the simulated results in synchronism with each other, and control tones on the basis of the material and oscillating state of the string. Also, the tone and picture generating device can simulate depression of the individual fingers on the guitar frets ("force check") to execute choking control based on the simulated results. Further, the picture generation and tone generation can be controlled in relation to each other in a variety of ways; for instance, generation of drum tones may be controlled in synchronism with player's hitting with a stick while the picture of the player's drum hitting operation is being visually demonstrated on the display.

Various control processing in the tone and picture generating device will first be outlined with reference to FIG. 2, then described in detail with reference to FIGS. 3 to 6, and then described in much greater detail with reference to FIGS. 7 to 12.

Figure 2:
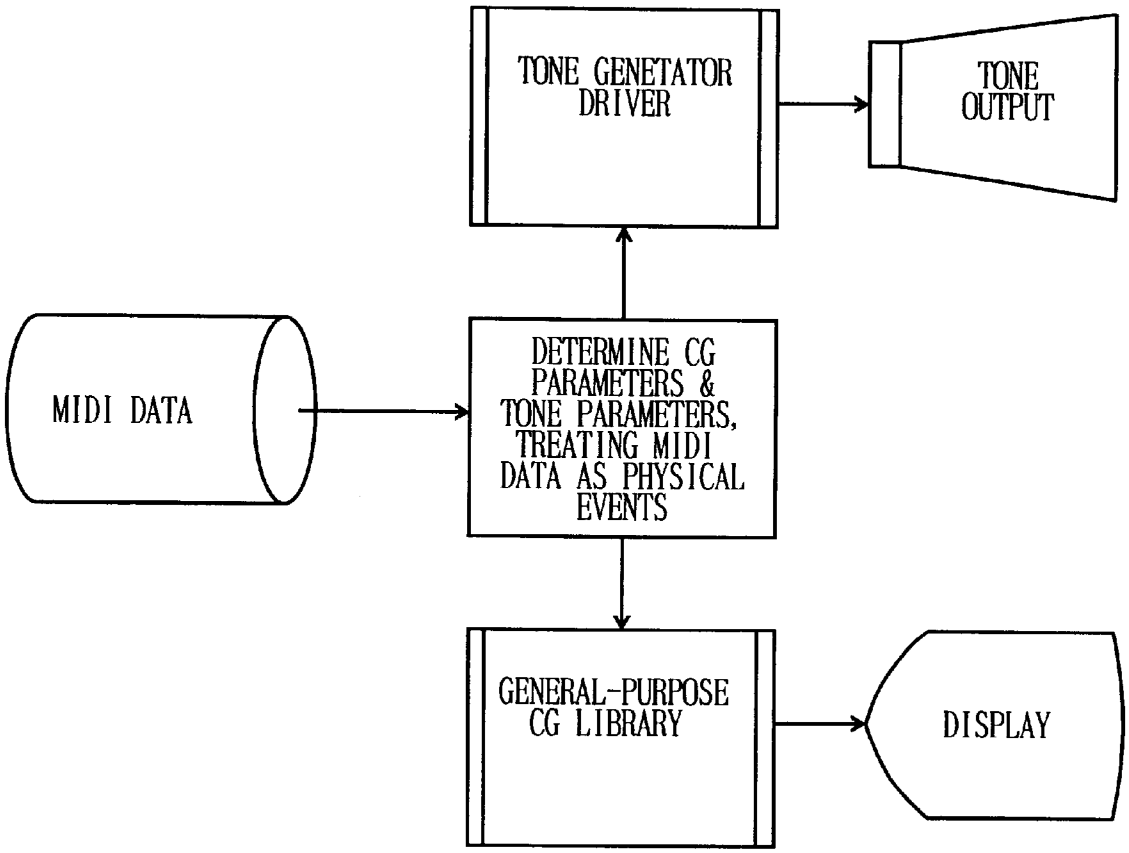
FIG. 2 is a block diagram outlining various control processing carried out in the tone and picture generating device of FIG. 1.

FIG. 2 is a block diagram outlining the control processing carried out in the tone and picture generating device. In FIG.

2, when performance data, comprising MIDI data, is input, the input data are treated as data of physical events involved in a musical performance. That is, when a tone of piano tone color is to be generated on the basis of the input MIDI data, key-on event data included in the input MIDI data is treated as a physical event of key depression effected by a human player and key-off event data in the input MIDI data is treated as another physical event of key release effected by the player. Then, CG parameters and tone parameters are determined by processes which will be later described with reference to FIGS. 3 to 12, and the thus-determined CG parameters are delivered to a general-purpose CG library while the determined tone parameters are delivered to a tone generator driver. In the general-purpose CG library, data representing a three-dimensional configuration of an object are generated on the basis of the delivered CG parameters through a so-called "geometry" operation, then a "rendering" operation is executed to generate two-dimensional picture data on the basis of the three-dimensional data, and then the thus-generated two-dimensional picture data are visually displayed. The tone generator driver, on the other hand, generates a tone signal on the basis of the delivered tone parameters, which is audibly reproduced as an output tone.

Figure 3:
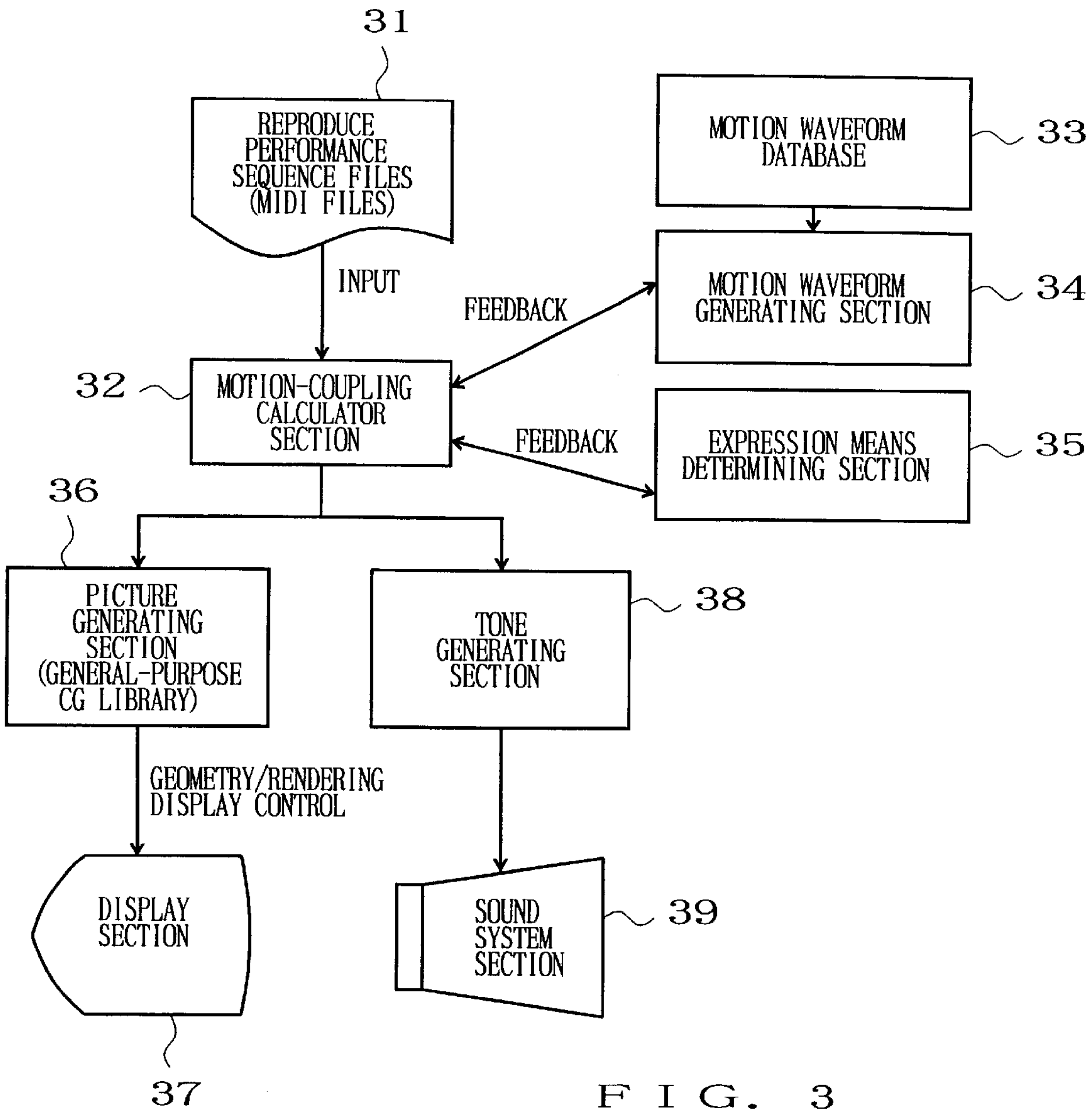
FIG. 3 is a diagram explanatory of various functions of the tone and picture generating device of FIG. 1.

FIG. 3 is a functional block diagram showing more fully the control processing of FIG. 2, which is explanatory of various functions carried out by the tone and picture generating device. In FIG. 3, the tone and picture generating device includes an input interface 31 for reading out and inputting various MIDI data contained in sequence files (MIDI files in this embodiment) for reproducing a performance on a musical instrument. As a user designates one of the MIDI files, the input interface 31 reads out the MIDI data from the designated MIDI file and inputs the read-out MIDI data into a motion-coupling calculator section 32 of the device.

It will be appreciated that whereas the input interface 31 is described here as automatically reading and inputting MIDI data from a designated MIDI file, the interface 31 may alternatively be arranged to input, in real time, MIDI data sequentially entered by a user or player. Further, the input data may of course be other than MIDI data.

The motion-coupling calculator section 32 delivers the MIDI data to a motion waveform generating section 34 and an expression means determining section 35, and receives motion waveforms generated by the motion waveform generating section 34 and various parameters (e.g., parameters representative of static and dynamic characteristics of the musical instrument and player) generated by the expression means determining section 35. Thus, the motion-coupling calculator section 32 synthesizes a motion on the basis of the received data values and input MIDI data, as well as respective skeletal model structures of the player and musical instrument operated thereby. Namely, the motion-coupling calculator section 32 operates to avoid possible inconsistency between various objects and between events.

The motion waveform generating section 34 searches through a motion waveform database 33, on the basis of the MIDI data received from the motion-coupling calculator section 32, to read out or retrieve motion waveform templates corresponding to the received MIDI data. On the basis of the retrieved motion waveform templates, the motion waveform generating section 34 generates motion waveforms through a process that will be later described with reference to FIG. 8 and then supplies the motion-coupling calculator section 32 with the thus-generated motion waveform. In the motion waveform database 33, there are stored various motion waveform data that were obtained by using the skeletal model structure to analyze various motions of the human player during performance of various music pieces on the musical instrument, as well as various motion waveform data that are obtained by using the skeletal model structure to analyze various motions of the musical instrument (physical events or phenomena) during the performance of various music pieces on the musical instrument.

Figure 4:
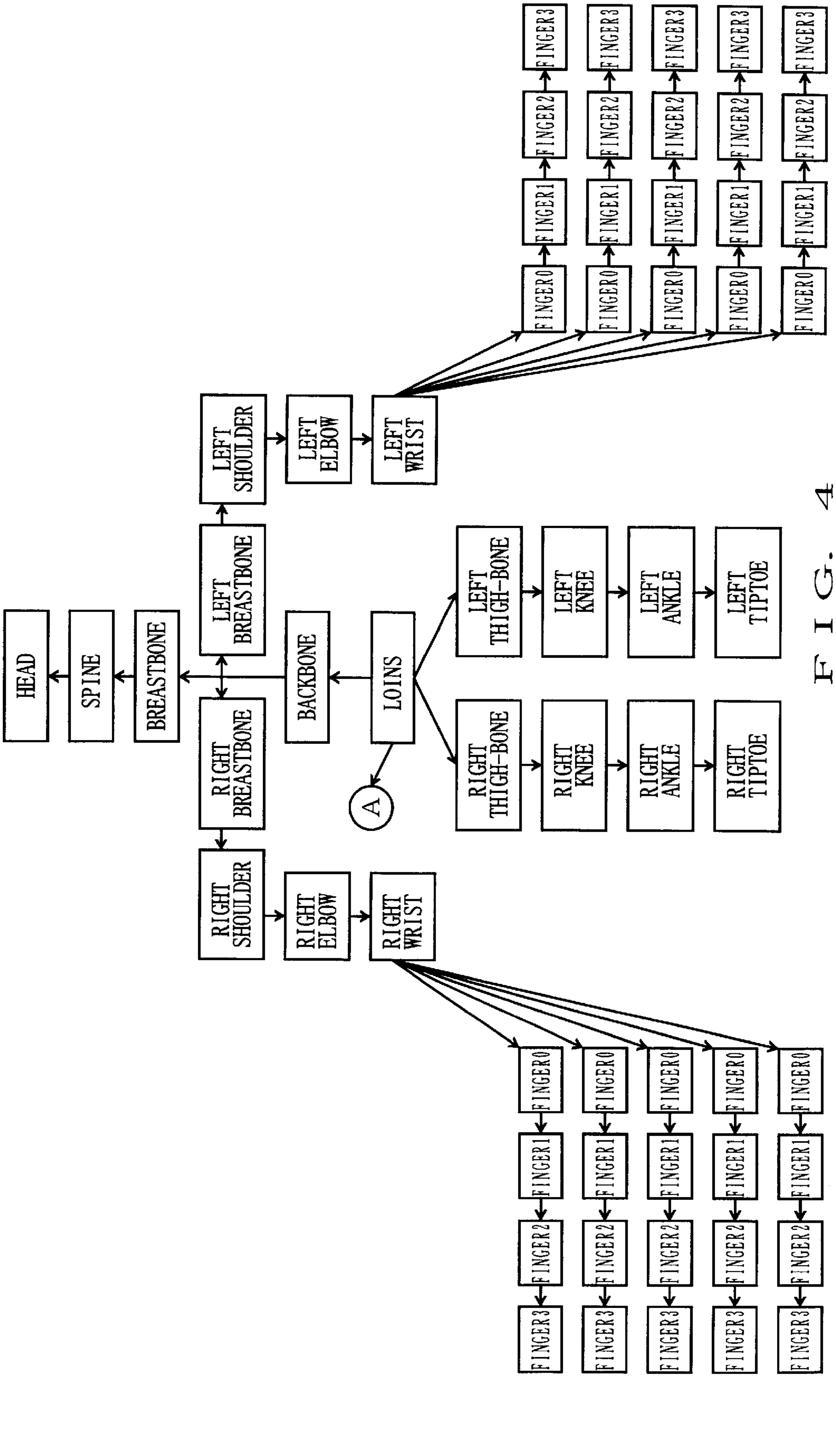
FIG. 4 is a block diagram symbolically showing an example of a human skeletal model structure.
Figure 5:
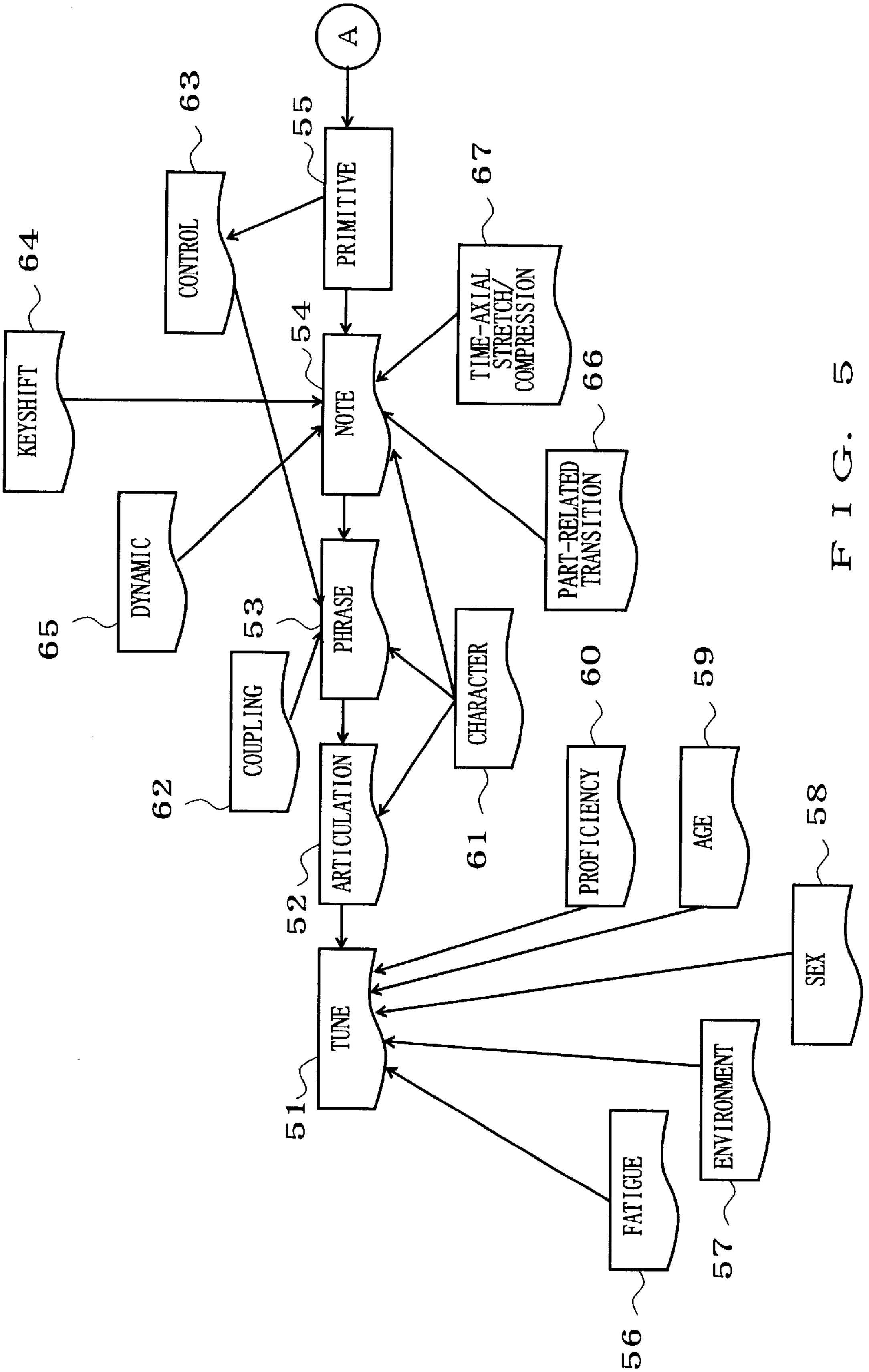
FIG. 5 is a diagram showing an exemplary organization of a motion waveform database of FIG. 3.
Figure 6:
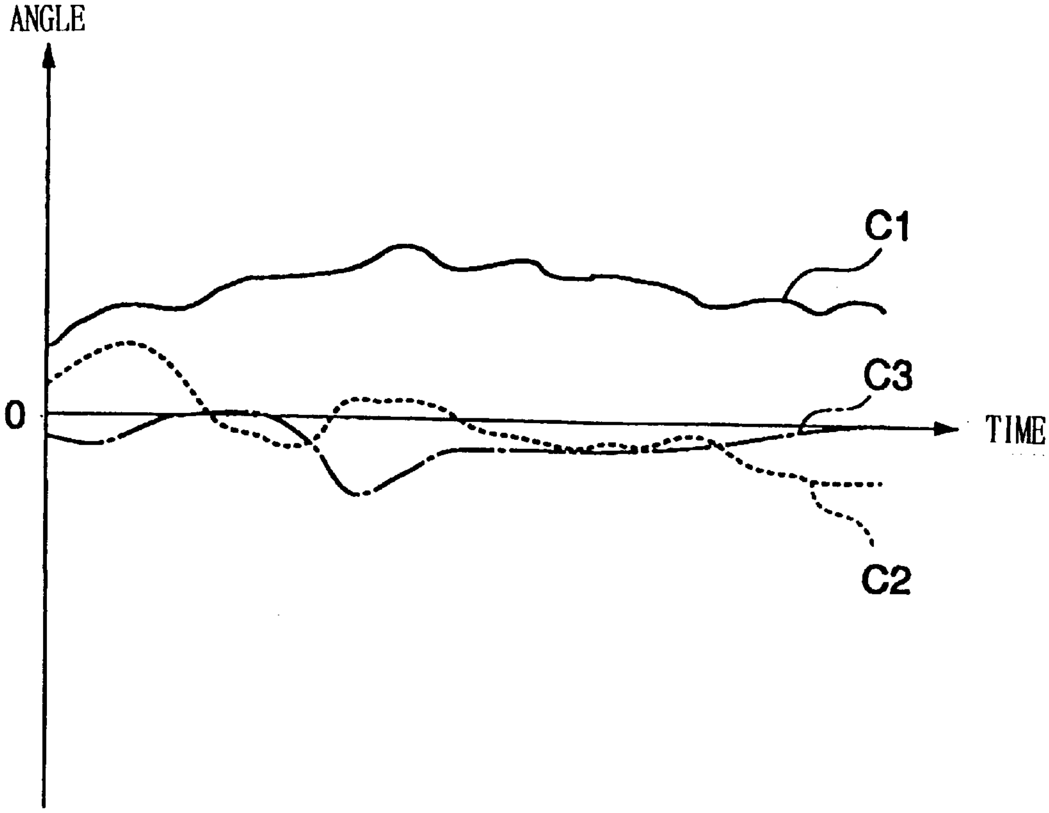
FIG. 6 is a diagram showing exemplary motion waveform templates of a particular node of a human player striking a predetermined pose.

The following paragraphs describe an exemplary organization of the motion waveform database 33 with reference to FIGS. 4 to 6. As shown in FIG. 5, the motion waveform database 33 is built in a hierarchical structure, which includes, in descending order of hierarchical level, a tune template unit 51, an articulation template 52, a phrase template 53, a note template 54 and a primitive unit 55. The primitive unit 55 is followed by a substructure that comprises waveform templates corresponding to various constituent parts (hereinafter "nodes") of a skeleton as shown in FIG. 4.

FIG. 4 is a block diagram symbolically showing a model of a human skeletal structure, on the basis of which the present embodiment executes CG synthesis. In FIG. 4, the skeleton comprises a plurality of nodes arranged in a hierarchical structure, and a plurality of motion waveform templates are associated with each of the principal nodes of the skeleton.

FIG. 6 is a diagram showing an exemplary motion waveform template of a particular node (head) of a human player striking a predetermined pose. In the figure, the vertical axis represents angle while the horizontal axis represents time. The term "motion waveform" as used herein represents, in Euler angles, a variation or transition of the node's rotational motions over, for example, a time period corresponding to a phrase of a music piece. Generally, body motions of the human player can be represented by displacement of the skeleton's individual nodes expressed in a local coordinates system and rotation of the nodes in Euler angles. In the illustrated motion waveform template of FIG. 6, however, the body motions of the human player are represented only in Euler angles, because the individual parts of the human body do not expand or contract relatively to each other and thus are represented by the rotation information alone in many cases. But, according to the principle of the present invention, the displacement information can of course be used in combination with the rotation information.

In FIG. 6, a solid-line curve C1 represents a variation of the Euler angles in the x-axis direction, a broken-line curve C2 represents a variation of the Euler angles in the y-axis direction, and a dot-and-dash-line curve C3 represents a variation of the Euler angles in the z-axis direction. In the embodiment, each of the curves, i.e., motion waveforms, is formed in advance using a technique commonly known as "motion capture".

In the embodiment of the invention, a plurality of such motion waveforms are prescored for each of the principal nodes, and the primitive unit 55 lists up these motion waveforms; thus, it can be said that the primitive unit 55 comprises a group of the motion waveforms. Alternatively, the motion waveforms may be subdivided and the primitive unit 55 may comprise a group of the subdivided motion waveforms.

Referring back to FIG. 4, motions of the other nodes with which no motion waveform template is associated are determined through arithmetic operations carried out by the motion waveform generating section 34, as will be later described in detail.

In FIG. 5, the tune template unit 51 at the highest hierarchical level of the motion waveform database 33 comprises a plurality of different templates describing common characteristics of an entire tune or music piece. Specifically, the common characteristics of an entire tune include degree of fatigue, environment, sex, age, performance proficiency, etc. of the player, and in corresponding relation to the common characteristics, there are stored a group of curves representative of the individual characteristics (or for modifying the shape of the selected motion waveform template), namely, a fatigue curve table 56, an environment curve table 57, a sex curve table 58, an age curve table 59 and a proficiency curve table 60. Briefly stated, each of the templates in the tune template unit 51 describes one of the curve tables 56 to 60 which is to be referred to.

The articulation template 52 is one level higher than the phrase template 53 and describes how to interlink, repetitively read and modify various templates lower in hierarchical level than the articulation template 52, modifying relationships between the lower-level templates, presence or absence of detected collision, arithmetic generation, etc. Specific contents of the modifying relationship are described in a character template 61. The term "modifying relationship" as used herein refers to a relationship indicative of how to modify the selected motion waveform template. Specifically, the articulation template 52 contains information representative of differences from the other template groups or substitute templates. Thus, the articulation template 52 describes one of the modifying relationships which is to be selected.

The phrase template 53 is a phrase-level template including data of each beat and lists up those of the templates lower in hierarchical level than the phrase template 53, i.e., the note template 54, primitive 55, coupling condition table 62, control template unit 63 and character template 61, which are to be referred to. The above-mentioned coupling condition table 62 describes rules to be applied in coupling the templates which are lower in hierarchical level than the phrase template 53, such as the note template 54 and primitive 55, as well as waveforms resultant from such coupling. The control template unit 63, which is subordinate to the phrase template 53, comprises a group of templates descriptive of motions that can not be expressed by sounded notes, such as finger or hand motions for coupling during absence of generated tone.

The note template 54 describes motions before and after sounding of each note; specifically, the note template 54 describes a plurality of primitives, part (note)-related transitional curves, key-shift curves, dynamic curves, etc. which are to be referred to. A key-shift table 64 contains a group of key-shift curves that are referred to in the note template 54, and a dynamic curve table 65 contains a group of dynamic curves that are referred to in the note template 54. A part-related transitional curve table 66 contains a group of curves each representing a variation of a part-related portion when a particular motion waveform is modified by the referred-to key-shift curve and dynamic curve. Further, a time-axial compression/stretch curve table 67 contains a group of curves each representing a ratio of time-axial compression/stretch of a particular motion waveform that is to be adjusted to a desired time length.

Referring now back to the functional block diagram of FIG. 3, the expression means determining section 35 receives the MIDI data from the motion-coupling calculator section 32, determines various parameter values through the process that will be later described in detail with reference to FIGS. 9 and 10, and sends the thus-determined parameter values to the motion-coupling calculator section 32.

As stated above, the motion-coupling calculator section 32 receives the motion waveforms from the motion waveform generating section 34 and the various parameter values from the expression means determining section 35, to synthesize a motion on the basis of these received data and ultimately determine the CG parameters and tone parameters. Because a simple motion synthesis would result in undesired inconsistency between individual objects and between physical events, the motion-coupling calculator section 32, prior to outputting final results (i.e., the CG parameters and tone parameters) to a picture generating section 36 and tone generating section 38, feeds interim results back to the motion waveform generating section 34 and expression means determining section 35, so as to eliminate the inconsistency. If it takes a relatively long time to repeat the feedback until the final results can be provided with the inconsistency appropriately eliminated, the feedback may be terminated somewhere along the way.

The picture generating section 36 primarily comprises the above-mentioned general-purpose CG library, which receives the CG parameters from the motion-coupling calculator section 32, executes the geometry and rendering operations to generate two-dimensional picture data, and sends the thus-generated two-dimensional picture data to a display section 37. The display section 37 visually displays the two-dimensional picture data.

The tone generating section 38, which primarily comprises the tone generator circuit 15 and effect circuit 16 of FIG. 1, receives the tone parameters from the motion-coupling calculator section 32 to generate a tone signal on the basis of the received tone parameters and outputs the thus-generated tone signal to a sound system section 39. The sound system section 39, which corresponds to the sound system 17 of FIG. 1, audibly reproduces the tone signal.

With reference to FIGS. 7 to 12, a further description will be made hereinbelow about the control processing executed by the individual elements of the tone and picture generating device arranged in the above-mentioned manner.

Figure 7:
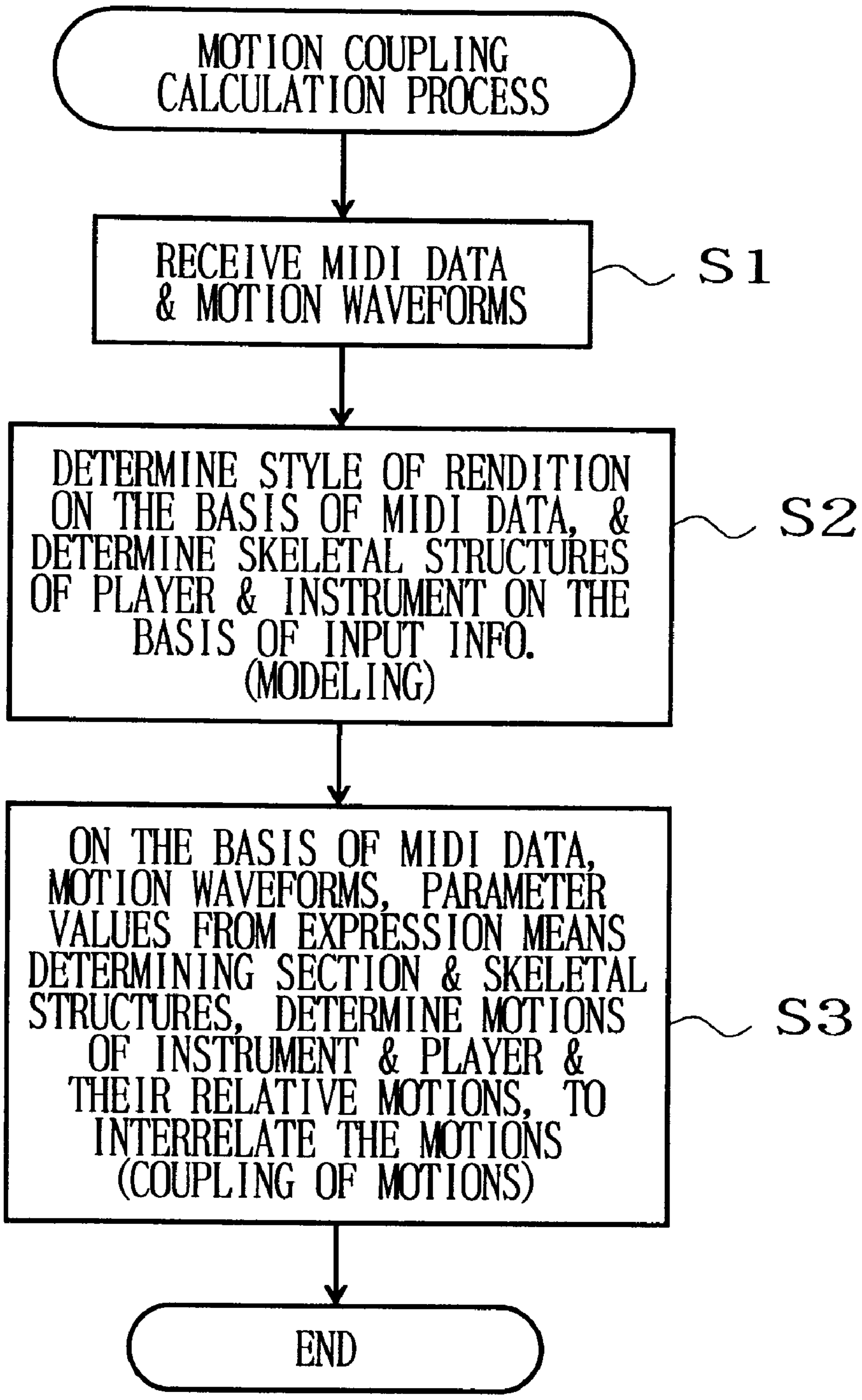
FIG. 7 is a flow chart of a motion coupling calculation process carried out by a motion-coupling calculator section of FIG. 3.

FIG. 7 is a flow chart of a motion coupling calculation process carried out by the motion-coupling calculator section 32 of FIG. 3. At first step S1, the motion-coupling calculator section 32 receives MIDI data via the input interface 31 and motion waveforms generated by the motion waveform generating section 34. At next step S2, the motion-coupling calculator section 32 determines a style of rendition on the basis of the received MIDI data and also identifies the skeletal structures of the player and musical instrument, i.e., executes modeling, on the basis of information entered by the player.

Then, at step S3, the calculator section 32 determines the respective motions of the player and musical instrument and their relative motions, and thereby interrelates the motions of the two, i.e., couples the motions, on the basis of the MIDI data, motion waveforms and parameter values determined by the expression means determining section 35 as well as the determined skeletal structures. This motion coupling calculation process is terminated after step S3.

Figure 8:
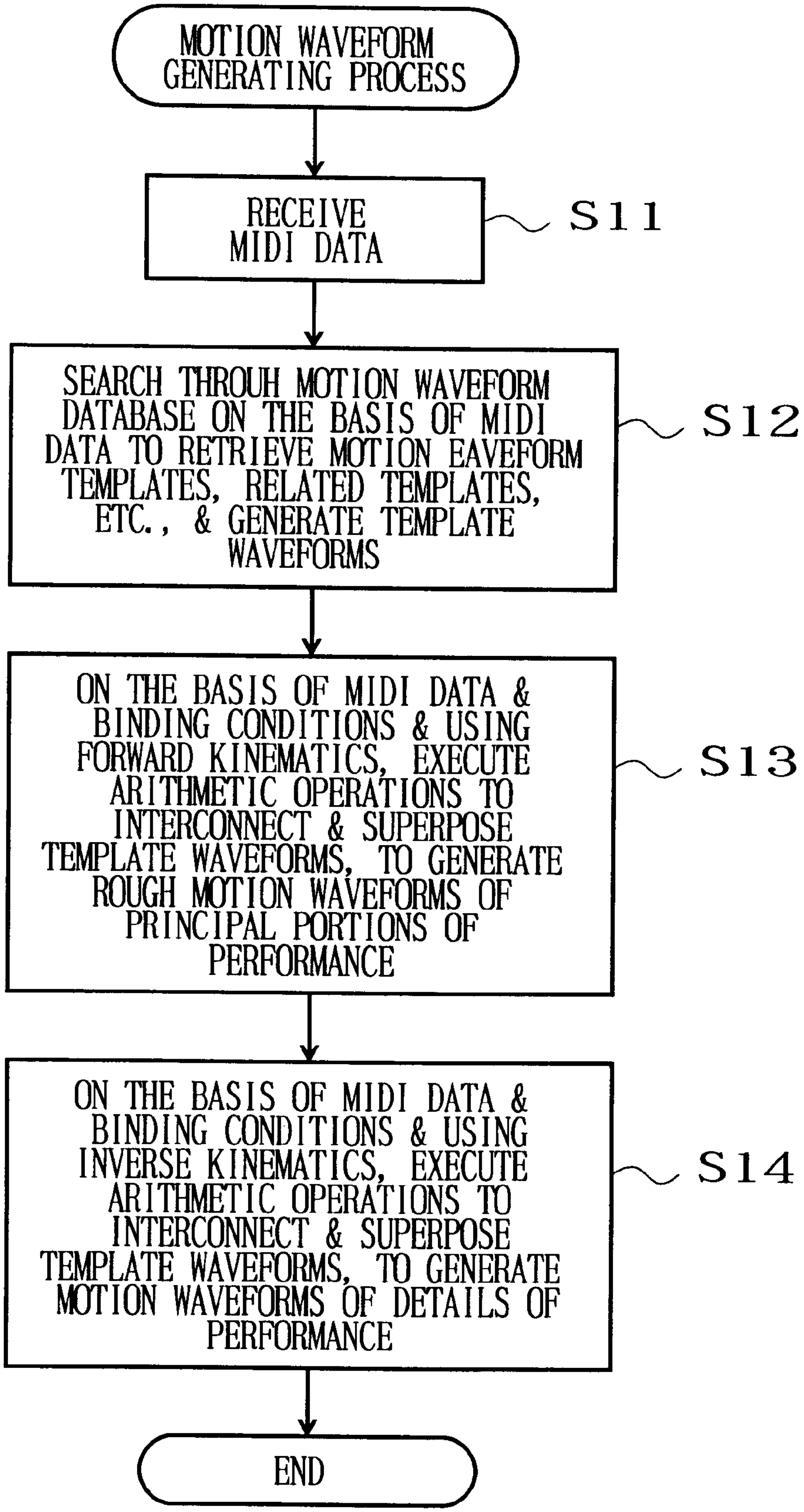
FIG. 8 is a flow chart of a motion waveform generating process carried out by a motion waveform generating section of FIG. 3.

FIG. 8 is a flow chart of a motion waveform generating process carried out by the motion waveform generating section 34 of FIG. 3. First, at step S11, the motion waveform generating section 34 receives the MIDI data passed from the motion-coupling calculator section 32, i.e., the MIDI data input via the input interface 31, which include the style of rendition determined by the calculator section 32 at step S2. Then, at step S12, the motion waveform generating section 34 searches through the motion waveform database 33 on the basis of the received MIDI data and retrieves motion waveform templates, other related templates, etc. to thereby generate template waveforms that form a basis of motion waveforms.

At next step S13, arithmetic operations are carried out for coupling or superposing the generated template waveforms using a predetermined technique, such as the "forward kinematics", and on the basis of the MIDI data and predetermined binding conditions. Thus, the motion waveform generating section 34 generates rough motion waveforms of principal portions of the performance.

Then, at step S14, the motion waveform generating section 34 generates motion waveforms of details of the performance by carrying out similar arithmetic operations for interconnecting or superposing the generated template waveforms using the "inverse kinematics" or the like and on the basis of the MIDI data and predetermined binding conditions. This motion waveform generating process is terminated after step S14.

As described above, the embodiment is arranged to control tone and picture simultaneously or collectively as a unit, by searching through the motion waveform database 33 on the basis of the MIDI data including the style of rendition determined by the motion-coupling calculator section 32. However, the present invention is not so limited; alternatively, various conditions for searching through the motion waveform database 33, e.g., pointers indicating motion waveform templates and other related templates to be retrieved, may be embedded in advance in the MIDI data.

Figure 9:
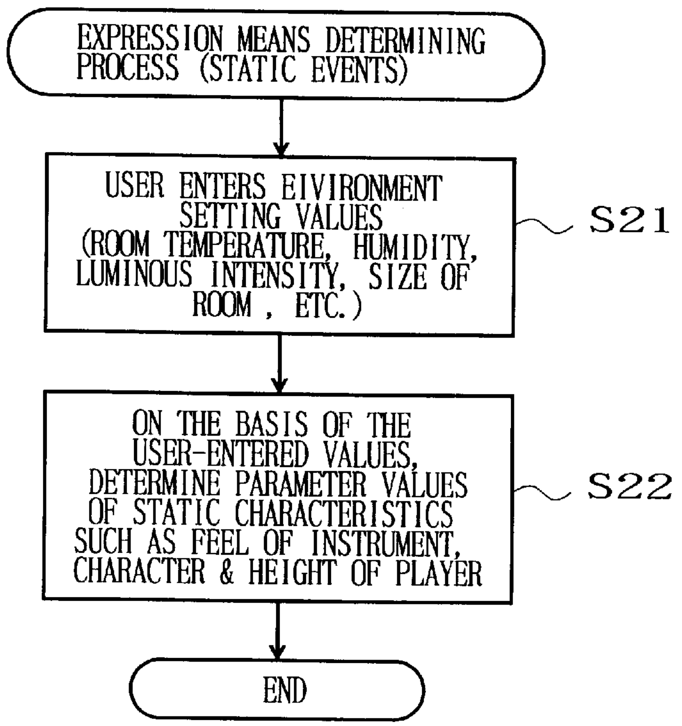
FIG. 9 is a flow chart of an operation for determining static events in an expression determining process carried out by an expression means determining section of FIG. 3.

FIG. 9 is a flow chart of an operation for determining static events in an expression determining process carried out by the expression means determining section 35. First, when the user enters environment setting values indicative of room temperature, humidity, luminous intensity, size of the room, etc., the expression means determining section 35 stores the entered values in, for example, a predetermined region of the RAM 7 at step S21. Then, at step S22, the expression means determining section 35 determines various parameter values of static characteristics, such as the feel based on the material of the musical instrument and the character, height, etc. of the player. After step S22, this operation is terminated.

Figure 10:
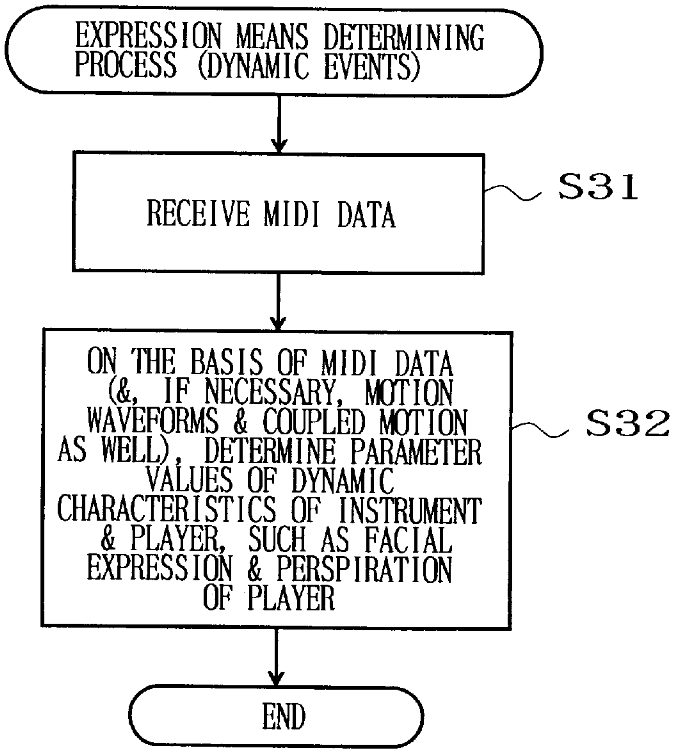
FIG. 10 is a flow chart of an operation for determining dynamic events in the expression determining process carried out by the expression means determining section.

FIG. 10 is a flow chart of an operation for determining dynamic events in the expression determining process carried out by the expression means determining section 35. First, at step S31, the expression means determining section 35 receives the MIDI data as at step S11. Then, at step S32, the expression means determining section 35 determines various parameter values of various parameters of dynamic characteristics of the musical instrument and the player, such as the facial expression and perspiration of the player, on the basis of the MIDI data (and, if necessary, the motion waveform and coupled motion as well). After step S32, this operation is terminated.

Figure 11:
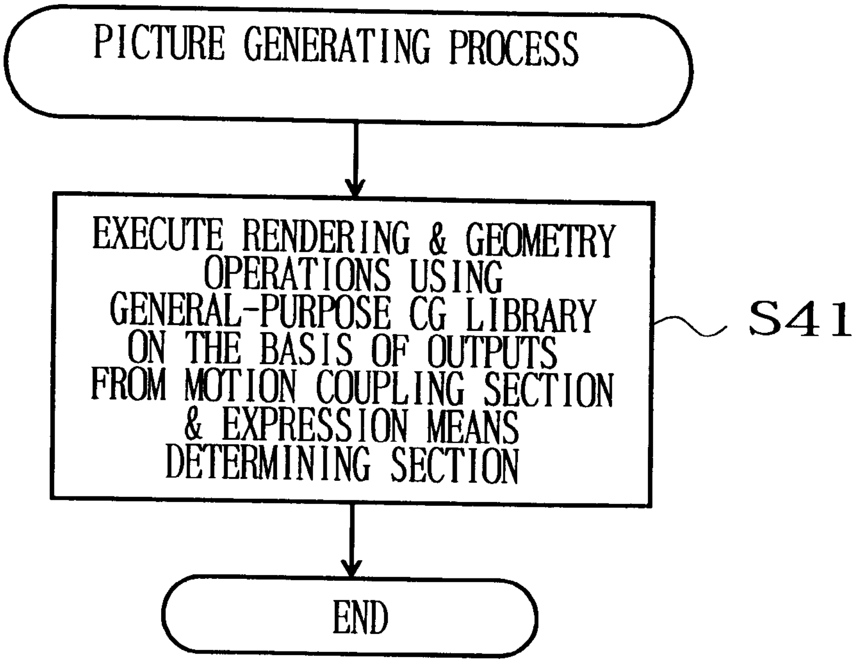
FIG. 11 is a flow chart of a picture generating process carried out by a picture generating section of FIG. 3.

FIG. 11 is a flow chart of a picture generating process carried out by the picture generating section 36, where the rendering and geometry operations are performed at step S41 using the general-purpose library on the basis of the outputs from the motion-coupling calculator section 32 and expression means determining section 35.

Figure 12:
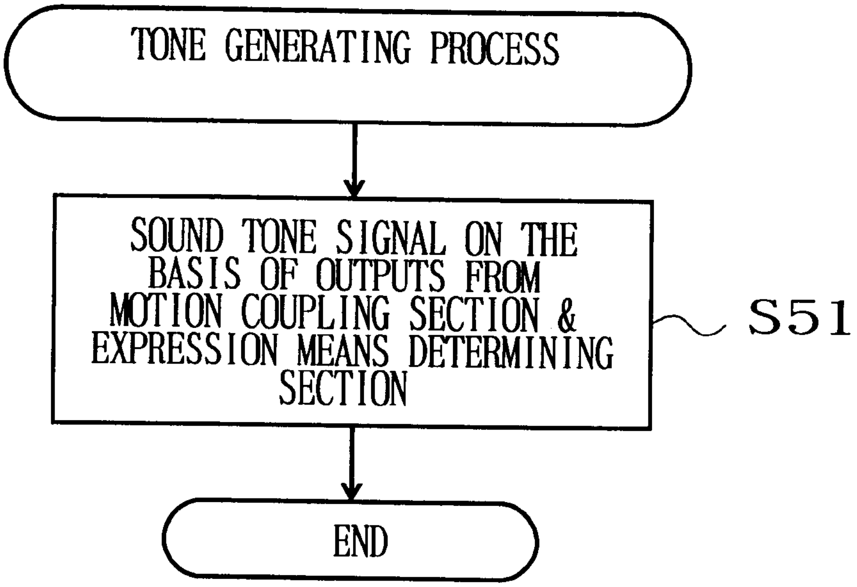
FIG. 12 is a flow chart of a tone generating process carried out by a ton e generating section of FIG. 3.

FIG. 12 is a flow chart of a tone generating process carried out by the tone generating section 38, where a tone signal is generated and sounded at step S51 on the basis of the outputs from the motion-coupling calculator section 32 and expression means determining section 35.

As described above, the tone and picture generating device in accordance with the preferred embodiment of the invention is characterized by: searching through the motion waveform database 33 on the basis of input MIDI data and generating a plurality of templates on the basis of a plurality of motion waveform templates corresponding to the MIDI data and other related templates; modifying and superposing the generated templates by use of the known CG technique to generate motion waveforms; feeding back the individual motion waveforms to eliminate inconsistency present in the motion waveforms; imparting expression to the inconsistency-eliminated motion waveforms in accordance with the output from the expression means determining section 35; and generating picture information and tone information (both including parameters) on the basis of the generated motion waveforms. With such an arrangement, the tone and picture generating device can accurately simulate a performance on a musical instrument in real time.

It should be obvious that the object of the present invention is also achievable through an alternative arrangement where a recording medium, containing a software program to carry out the functions of the above-described embodiment, is supplied to a predetermined system or device so that the program is read out for execution by a computer (or CPU or MPU) of the system or device. In this case, the program read out from the recording medium will itself perform the novel functions of the present invention and hence constitute the present invention.

The recording medium providing the program may, for example, be a hard disk installed in the hard disk drive 11, CD-ROM 21, MO, MD, floppy disk 20, CD-R (CD-Recordable), magnetic tape, non-volatile memory card or ROM. Alternatively, the program to carry out the functions may be supplied from the other MIDI instrument 100 or from the server computer 102 via the communication network 101.

It should also be obvious that the functions of the above-described embodiment may be performed by an operating system of a computer executing a whole or part of the actual processing in accordance with instructions of the program, rather than by the computer running the program read out from the recording medium.

It should also be obvious that after the program read out from the recording medium is written into a memory of a function extension board inserted in a computer or a function extension unit connected to a computer, the functions of the above-described embodiment may be performed by a CPU or the like, mounted on the function extension board or unit, executing a whole or part of the actual processing in accordance with instructions of the program.

In summary, the present invention is characterized by: simulating, on the basis of input performance information, physical events or phenomena of a human player and a musical instrument operated by the player; determining values of picture-controlling and tone-controlling parameters in accordance with results of the simulation; generating picture information in accordance with the determined picture-controlling parameter values; and generating tone information in accordance with the determined tone-controlling parameter values. With such a novel arrangement, the tone and picture can be controlled collectively as a unit, and thus it is possible to accurately simulate the musical instrument performance on the real-time basis.

What is claimed is:

1. A picture generating device comprising:

a musical performance information receiving section that receives musical performance information including information representative of musical tones;

a detecting section that, on the basis of the musical performance information received via said musical performance information receiving section, detects a physical event of at least one of a player and a musical instrument during player's performance operation of the musical instrument;

a parameter generating section that, in accordance with a result of detection by said detecting section, generates a picture parameter for controlling a picture; and a picture information generating section that executes an arithmetic operation on the basis of the picture parameter generated by said parameter generating section and generates picture information as a result of the arithmetic operation, said picture information representing at least one of the player and the musical instrument.

2. A picture generating device as recited in claim 1 wherein said parameter generating section includes a database storing a plurality of template data corresponding to various physical events of at least one of the player and musical instrument during player's performance operation of the musical instrument, and wherein said parameter generating section searches through the database to retrieve appropriate template data on the basis of the result of detection by said detecting section and generates the picture parameter corresponding to the detected physical event on the basis of the appropriate template data retrieved from the database.

3. A picture generating device as recited in claim 2 wherein the plurality of template data correspond to various elements of a skeletal model structure relating to motions of the player or the musical instrument.

4. A picture generating device as recited in claim 3 wherein said parameter generating section generates the picture parameter corresponding to the detected physical event, by combining those of the template data corresponding to two or more of the template data in the skeletal model structure to thereby provide multidimensional motion-representing data and coupling the multidimensional motion-representing data in a time-serial fashion.

5. A picture generating device as recited in claim 4 wherein said parameter generating section includes a section that, in coupling the template data and coupling the motion-representing data, modifies the template data or the multidimensional motion-representing data to avoid inconsistency between matters or events to be combined or coupled.

6. A picture generating device as recited in claim 2 wherein said parameter generating section further includes a modifying section that modifies contents of the retrieved template data, to thereby generate the picture parameter on the basis of the template data modified by said modifying section.

7. A picture generating device as recited in claim 1 wherein said parameter generating section includes a setting section that sets various conditions to be applied in generating the picture parameter corresponding the detected physical event, to thereby generate the picture parameter taking the conditions set by said setting section into account.

8. A picture generating device as recited in claim 1 wherein said detecting section, on the basis of the received musical performance information, determines a style of rendition relating to the musical performance information and detects the physical event taking the determined style of rendition into account.

9. The picture generating device as recited in claim 1 wherein said picture parameter generated by said parameter generating section controls picture data indicative of motion varying with time.

10. The picture generating device as recited in claim 1 wherein said parameter generating section, in accordance with the result of detection by said detecting section, also generates a tone parameter for controlling a tone, and wherein said picture generating device further comprises a tone information generating section that generates tone information in accordance with the tone parameter generated by said parameter generating section.

11. A picture generating device as recited in claim 1, wherein said musical performance information received by said receiving section is input in real time by a user.

12. A method of generating picture information comprising:

a first step of receiving musical performance information including information representative of musical tones;

a second step of, on the basis of the musical performance information received by said first step, detecting a physical event of at least one of a player and a musical instrument during player's performance operation of the musical instrument;

a third step of, in accordance with a result of detection by said second step, generating a picture parameter for controlling a picture; and a fourth step of executing an arithmetic operation on the basis of the picture parameter generated by said third step and generating picture information as a result of the arithmetic operation, said picture information representing at least one of the player and the musical instrument.

13. A method as recited in claim 12 wherein said third step further includes:

a step of searching through a database storing a plurality of template data corresponding to various physical events of at least one of the player and musical instrument during player's performance operation of the musical instrument and retrieving from the database appropriate template data on the basis of the physical event detected by said second step; and a step of generating the picture parameter corresponding to the detected physical event on the basis of the appropriate template data retrieved from the database.

14. A method as recited in claim 13 wherein said third step further includes a modifying step of modifying contents of the retrieved template data, to thereby generate the picture parameter on the basis of the template data modified by said modifying step.

15. A method as recited in claim 12 wherein said third step further includes a setting step of setting various conditions to be applied on generating the picture parameter corresponding the detected physical event, to thereby generate the picture parameter taking the conditions set by said setting step into account.

16. A method as recited in claim 12 wherein said second step includes a determining step of, on the basis of the received musical performance information, determining a style of rendition relating to the musical performance information and detecting the physical event taking into account the style of rendition determined by said determining step.

17. The method as recited in claim 12 wherein said third step, in accordance with the result of detection by said second step, also generates a tone parameter for controlling a tone, and wherein said method further comprises a fifth step of generating tone information in accordance with the tone parameter generated by said third step.

18. A machine-readable recording medium containing a group of instructions of a program to be executed by a computer to execute a method of generating picture information, said program comprising:

a first step of receiving musical performance information including information representative of musical tones;

a second step of, on the basis of the musical performance information received by said first step, detecting a physical event of at least one of a player and a musical instrument during player's performance operation of the musical instrument;

a third step of, in accordance with a result of detection by said second step, generating a picture parameter for controlling a picture; and a fourth step of executing an arithmetic operation on the basis of the picture parameter generated by said third step and generating picture information as a result of the arithmetic operation, said picture information representing at least one of the player and the musical instrument.

19. The medium as recited in claim 18 herein said third step, in accordance with the result of detection by said second step, also generates a tone parameter for controlling a tone, and wherein said program further comprises a fifth step of generating tone information in accordance with the tone parameter generated by said third step.

20. A method of generating picture information varying in response to progression of a musical performance, said method comprising:

a first step of receiving musical performance information including information representative of musical tones;

a second step of, on the basis of analysis of the musical performance information received by said first step, detecting a physical event of at least one of a player and a musical instrument during player's performance operation of the musical instrument;

a third step of, in accordance with a result of detection by said second step, generating a picture parameter for controlling a picture; and a fourth step of executing an arithmetic operation on the basis of the picture parameter generated by said third step and generating picture information as a result of the arithmetic operation, said picture information representing at least one of the player and the musical instrument.

21. A method of controlling a tone comprising:

a first step of receiving musical performance information including information representative of musical tones;

a second step of, on the basis of analysis of the musical performance information received by said first step, detecting a physical event of at least one of a player and a musical instrument during player's performance operation of the musical instrument;

a third step of, in accordance with a result of detecting by said second step, generating a tone parameter for controlling a tone; and a fourth step of executing an arithmetic operation on the basis of the tone parameter generated by said third step and controlling a tone to be generated as a result of the arithmetic operation.

22. A picture generating device comprising:

a musical performance information receiving section that receives musical performance information including information representative of musical tones;

a parameter generating section that generates a picture parameter for controlling a picture on the basis of the musical performance information received via said musical performance information receiving section, said picture parameter being responsive to a physical event suitable for the received musical performance information; and a picture information generating section that executes an arithmetic operation on the basis of the picture parameter generated by said parameter generating section and generates picture information as a result of the arithmetic operation, said picture information representing at least one of the player and the musical instrument.

23. A picture generating device as recited in claim 22, wherein said musical performance information received by said receiving section is input in real time by a user.

* * * * *